(12) United States Patent
Vadaparty et al.

(10) Patent No.: US 10,802,897 B1
(45) Date of Patent: *Oct. 13, 2020

(54) SYSTEM FOR TRACKING TRANSACTION DATA ACROSS APPLICATIONS

(71) Applicant: Morgan Stanley Services Group Inc., New York, NY (US)

(72) Inventors: Kumar Vadaparty, Belle Mead, NJ (US); Vishal Agrawal, Montville, NJ (US); David Testa, Robbinsville, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,416

(22) Filed: May 7, 2019

(51) Int. Cl.
*G06F 9/54* (2006.01)
*G06F 16/9538* (2019.01)
*G06Q 20/40* (2012.01)
*G06Q 20/38* (2012.01)

(52) U.S. Cl.
CPC .......... *G06F 9/546* (2013.01); *G06F 16/9538* (2019.01); *G06Q 20/389* (2013.01); *G06Q 20/405* (2013.01)

(58) Field of Classification Search
CPC ...................................................... G06F 9/546
USPC .......................................................... 719/313
See application file for complete search history.

(56) References Cited

U.S. PATENT DOCUMENTS

| 2012/0260133 | A1 | 10/2012 | Beck et al. | |
| 2012/0260135 | A1 | 10/2012 | Beck et al. | |
| 2017/0242784 | A1* | 8/2017 | Heorhiadi | H04L 41/5038 |
| 2018/0307514 | A1* | 10/2018 | Koutyrine | G06F 9/45558 |

* cited by examiner

*Primary Examiner* — Andy Ho
(74) *Attorney, Agent, or Firm* — K&L Gates LLP

(57) ABSTRACT

A computer-implemented system and method to track a transaction that is executed by a series of applications in a workflow. Each application in the workflow generates an application log file that includes a standard header, which in turn includes a transaction ID associated with the transaction, an outcome associated with a step of the transaction executed by each of the applications, and a timestamp associated with the step of the transaction. The application log file with the header is received and stored by the computer system. The computer system can thereafter retrieve and display the entire transaction history for the transaction across all of the applications in response to a user query. The standard header is appended to the application log file and agnostic to the underlying technology used to implement the application system so that any transaction can be reconstructed end-to-end regardless of the form of the application system.

21 Claims, 6 Drawing Sheets

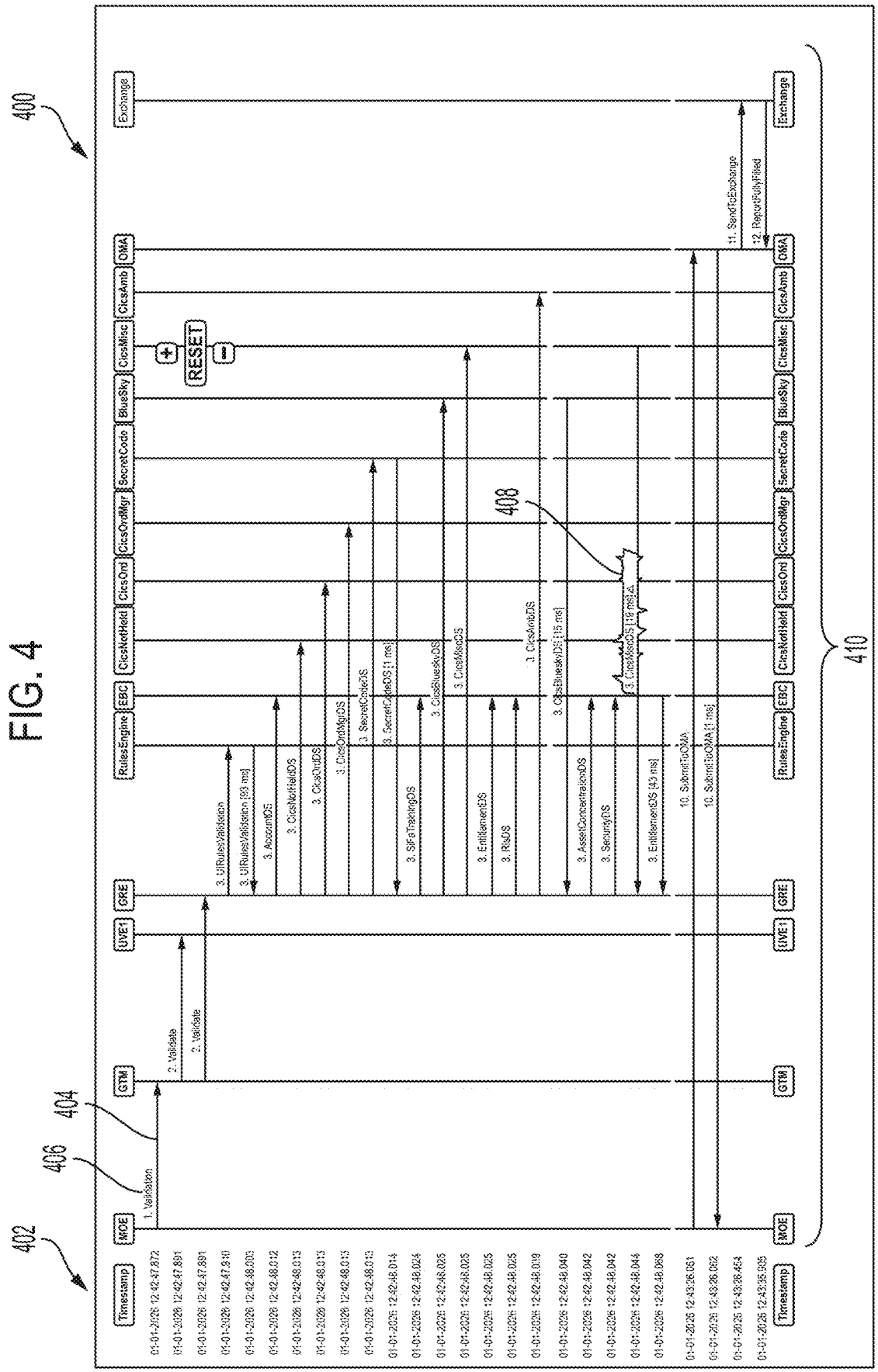

| Product | Channel | TouchPoint | Operation | Mode | Date Range |
|---|---|---|---|---|---|
| Please Select | Please Select | Please Select | Please Select | Please Select | 11-27-2018 15:19:33 - 11-27-2018 16:19:33 |

| Minimum Duration | Current System | Key Field | Key Field Value | | Correlation ID |
|---|---|---|---|---|---|
| 0 ms | Please Select | Please Select | | | |

☐ Show Failed Transactions Only

⊕ Add Key Field    ⟲ Reset    🔍 Search

Transactions

504

| Operation | Mode | Correlation ID | External Reference ID | Host Name | Current System | Outcome | Timestamp | Duration [ms] |
|---|---|---|---|---|---|---|---|---|
| Trade | ANY | 2bda2a8b-1895-4bcb-b74e-333187780c99b | 2bda2a8b-1885-40cb-b74e-333187780c99b | ivapp1173305i.devin3.ns.com | | BLOCK | 11-27-2018 16:15:43.545 | 5 |
| Trade | ANY | ba59655e-a2f3-4937-98a4-b21d4b065ca4 | ba59655e-a2f3-4937-98a4-b21d4b065ca4 | ivapp1173305i.devin3.ns.com | | BLOCK | 11-27-2018 16:15:43.537 | 6 |
| Trade | ANY | 67ee9440-e908-4677-bfd4-9d6b0b630b40d | 67ee9440-e908-4677-bfd4-9d6b0b630b40d | ivapp1173305i.devin3.ns.com | | SUCCESS | 11-27-2018 16:15:43.528 | 138 |
| Trade | ANY | d13b94d3-01a3-4eb7-a608-56bd9b62aac7 | d13b94d3-0ba3-4eb7-a608-56bd9b62aac7 | ivapp1173305i.devin3.ns.com | | BLOCK | 11-27-2018 16:15:43.030 | 5 |
| Trade | ANY | e19e7604-f831-4ae6-b778-cf89121-a587cd | e19e7604-ff33-4ae5-b778-c89121-a587cd | ivapp1173305i.devin3.ns.com | | BLOCK | 11-27-2018 16:15:42.876 | 5 |
| Trade | ANY | 90d28b6b4-c33-45cd-9c92-097c12e1e834 | 90d28b6b-4c33-45cd-9c92-097c12e1e834 | ivapp1173305i.devin3.ns.com | | BLOCK | 11-27-2018 16:15:41.805 | 5 |
| Trade | ANY | 97178196-66c8-4194-93c3-57791614a155 | 97178196-66c8-4194-93c3-57791614a155 | ivapp1173305i.devin3.ns.com | | BLOCK | 11-27-2018 16:15:41.692 | 6 |
| Trade | ANY | 91496b7e-985a-454f-9404-988f4ff01d11 | 91496b7e-985a-454f-9404-988f4ff01d11 | ivapp1173305i.devin3.ns.com | | BLOCK | 11-27-2018 16:15:41.653 | 5 |
| Trade | ANY | cd87add5-9351-4e63-a69a-76030309d22d | cd87add5-9361-4e63-a69a-76030309d22d | ivapp1173305i.devin3.ns.com | | SUCCESS | 11-27-2018 16:15:41.642 | 164 |
| Trade | ANY | dec4bd81-3494-4bbc-8cb5-0115f0bf7760r | dec4bd81-3494-4bbc-9cb6-0115f0bf7760r | ivapp1173305i.devin3.ns.com | | BLOCK | 11-27-2018 16:15:41.378 | 8 |

Entries Per Page: 10 ▼    [Prev] Page 1 of 20 [Next]    200 records fetched

US 10,802,897 B1

SYSTEM FOR TRACKING TRANSACTION DATA ACROSS APPLICATIONS

BACKGROUND

Many firms utilize a number of different interconnected applications to carry out transactions as part of the firm's business, such as processing an order to buy or sell securities on behalf of a client, processing payment and scheduling delivery for an item purchased through the firm, or updating a user's contact and billing information stored with the firm. However, transactions can and do fail because, as is inherent with software, errors can occur during the execution of an application and/or as the applications interact with each other. Oftentimes, it may not be readily apparent which application in the transaction workflow caused the transaction to fail, and it can be difficult to ascertain what precisely caused the error, even if the failing application can be identified. Currently available diagnostic tools fail to provide transaction-level insights across the entire array of applications utilized to execute the transaction and thus can still be inadequate at the tasks of auditing transactions and identifying where precisely errors occurred within the transaction workflow.

SUMMARY

In one general aspect, the present invention is directed to computer-implemented systems and methods for tracking a transaction that involves execution by a plurality of applications in a workflow for the transaction. For example, the method may comprise the step receiving, by a transaction logging computer system, an application log file generated by each of the plurality of applications involved in the transaction, where the application log file comprises a standard header that is appended to each application log file regardless of how the application log file is generated and/or is agnostic to the underlying technologies utilized to implement the plurality of applications. The header comprising a transaction ID associated with the transaction, an outcome associated with a step of the transaction executed by each of the applications, and a timestamp associated with the step of the transaction. The method also comprises the step of storing, by the computer system, each application log file and the header according to the transaction ID. The method further comprises the step of retrieving, by the computer system, in response to a query for the transaction ID, data including each header from each application log filed generated during execution of the transaction corresponding to the transaction ID. The method also comprises the step of transmitting, by the computer system, the data to a user interface for display of a transaction history for the transaction.

Various embodiments of the present invention can provide several benefits that solve issues inherent to organizations that use systems of interconnected applications for performing or executing various transactions. For example, the transaction logging system is agnostic to the technologies and/or processes utilized to execute and/or implement the applications in the workflow; therefore, the transaction logging system can be implemented with any type of application system. As another example, the transaction logging system can collect and consolidates all of the application logs generated by the applications in a single location that is accessible by the organization's personnel. Further, by enforcing or receiving all of the data from the various applications to which the transaction logging system is connected with a common header, the transaction logging system can ingest the application logs and other data from any type of application and integrate all of the different application logs into a single, cohesive, searchable system. Still further, by combining the data from all of the application logs across an interconnected set of applications defining a particular workflow, the transaction logging system provides a single, comprehensive, end-to-end view of every single transaction that has been executed. The end-to-end view of each transaction reveals to users the precise location at which an error or other issue occurred that caused a transaction to fail to be executed. Even further, the transaction logging system is designed to leverage a function that is already performed by the applications, namely, generating application log files, which essentially every single application is already programmed to do. Therefore, the transaction logging system can operate asynchronously with the applications, eliminating any potential performance bottlenecks that could be caused by forcing the applications in a transaction workflow to perform additional tasks from the original task that the application was designed to perform.

These and other potential benefits realizable with the present invention will be apparent from the description that follows.

FIGURES

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

FIG. 4 is a user interface for displaying a transaction timeline diagram, in accordance with at least one aspect of the present disclosure.

FIG. 5 is a search interface for performing transaction queries, in accordance with at least one aspect of the present disclosure.

DESCRIPTION

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting example aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and not to limit the scope thereof.

Figure 1A:
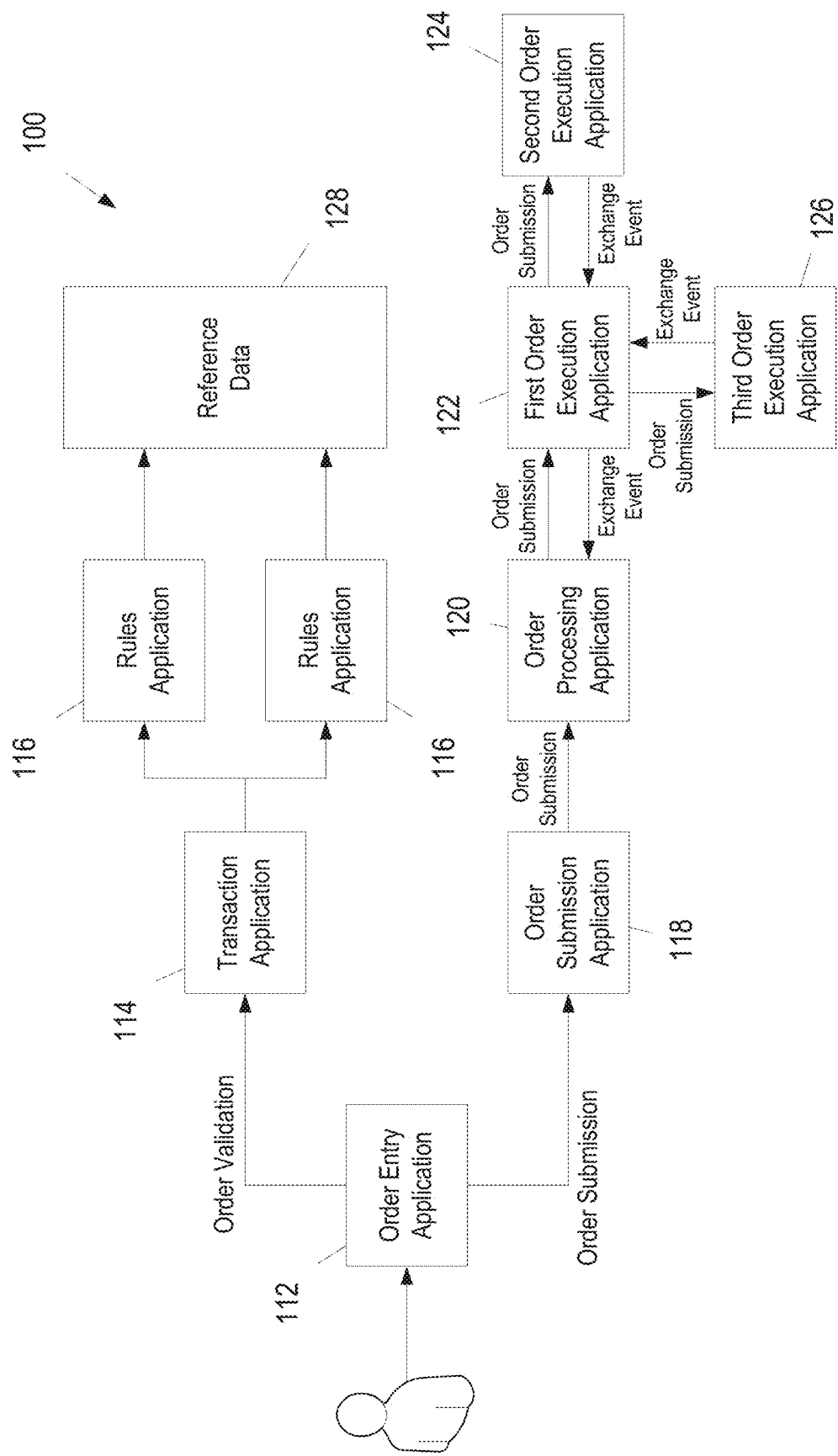
FIG. 1A is a block diagram of an application system for executing a transaction, in accordance with at least one aspect of the present disclosure.

In many brokerage firms, executing a transaction to buy or sell financial securities requires the use of multiple interconnected applications in the workflow of the transaction. When there is an error in executing the transaction, it can be challenging to determine where precisely the error occurred in the transaction workflow because it may be necessary to review a large number of application logs to even locate the error, much less diagnose and determine the cause of the error. Further, the more applications that are required to execute a transaction or the more complex the interactions are between the applications, the more difficult the error diagnosis process becomes. For example, FIG. 1A is a block diagram of an illustrative application system 100 for executing a transaction, namely, a securities transaction (i.e., purchasing or selling securities). The application system 100 includes a series of interconnected applications 112-126 (also shown generically as element 110 in FIG. 2) that define a workflow for the given transaction. In various aspects, the applications 110 can be executed automatically based on data received from other applications 110 or at least partly manually controlled by firm personnel or other users. For example, an application 110 can present data pertaining to the transaction to a person(s) that must be manually reviewed and approved by the person(s) for the transaction workflow to continue.

In the illustrative application system 100, a user (e.g., a financial advisor) can initiate a securities trade transaction via an order entry application 112, which then causes multiple processes to commence (i.e., the order validation process and the order submission process), each of which involves or makes use of multiple applications 110. Upon the order being entered, an order validation sub-process is initiated where the order entry application 112 provides data pertaining to the transaction to a transaction application 114, which then provides relevant transaction data to a set of rules applications 116 that validate the securities based upon a set of reference data 128, which can include client data. Further, an order submission sub-process may be executed currently where an order submission application 118 provides data pertaining to the transaction to an order processing application 120, which then coordinates the execution of the securities transaction by and between a series of order execution applications 122, 124, 126 that are each responsible for carrying out a series of trades to fully effectuate the securities trade initiated by the initial user. Any of these applications 110 can be executed automatically by a computer system or require input from a user (e.g., firm personnel) for the application 110 to complete its programmed task. As can be seen from FIG. 1A, even an apparently simple transaction, such as a securities trade, can require a significant number of applications 110 to work in concert for the transaction to be fully carried out. Further, an error that could cause the securities transaction to fail (e.g., the trade is not completed) could occur during the execution of any one of these applications 110, and technical support or operations personnel for the firm would have to search through all of the logs for all of the various applications 110 to determine in which application 110 the error occurred and what caused the error. This can be an incredibly time-consuming and expensive process.

Figure 1B:
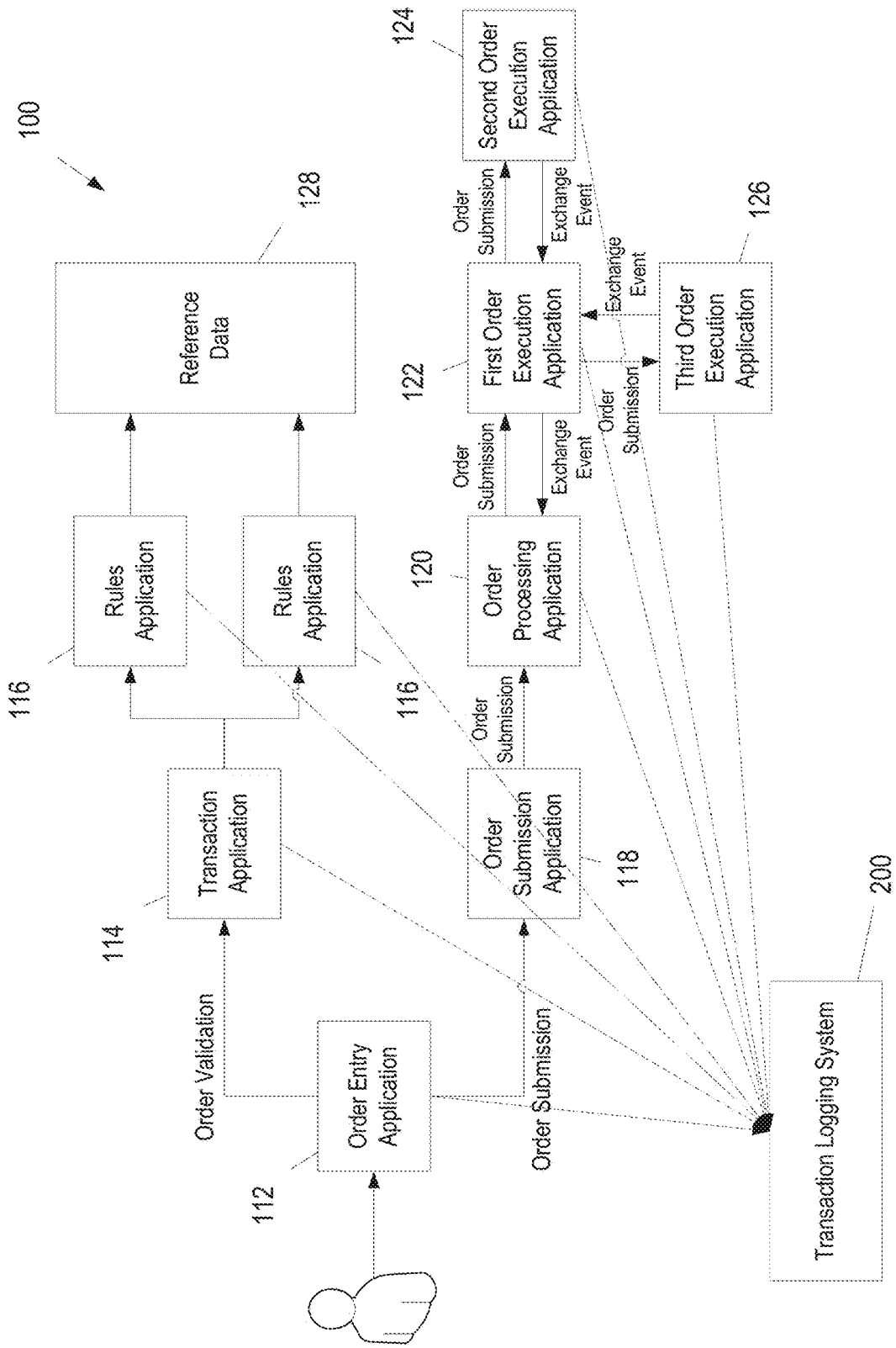
FIG. 1B is a block diagram of the application system on FIG. 1A where the applications are connected to a transaction logging system, in accordance with at least one aspect of the present disclosure.

To address this problem, a transaction logging system 200 can be configured to receive application or systems logs that are generated by one or more of the applications 110 in one or more transaction workflows, such as the workflow illustrated in FIGS. 1A and 1B. The applications 110 can include any type of software application implemented on web servers, mainframes, and any other type of computer hardware and/or computer system architecture. In one aspect, the applications 110 can be configured to upload their log files to the transaction logging system 200, shown in FIG. 1B, which then collates the data from the log files across all of the applications 110 and then presents all of the end-to-end data associated with the given transaction via a user interface that allows users to view all of the end-to-end events associated with each transaction, investigate errors, search for transactions according to various data fields, view trends associated with transactions according to transaction types, and so on.

Figure 2:
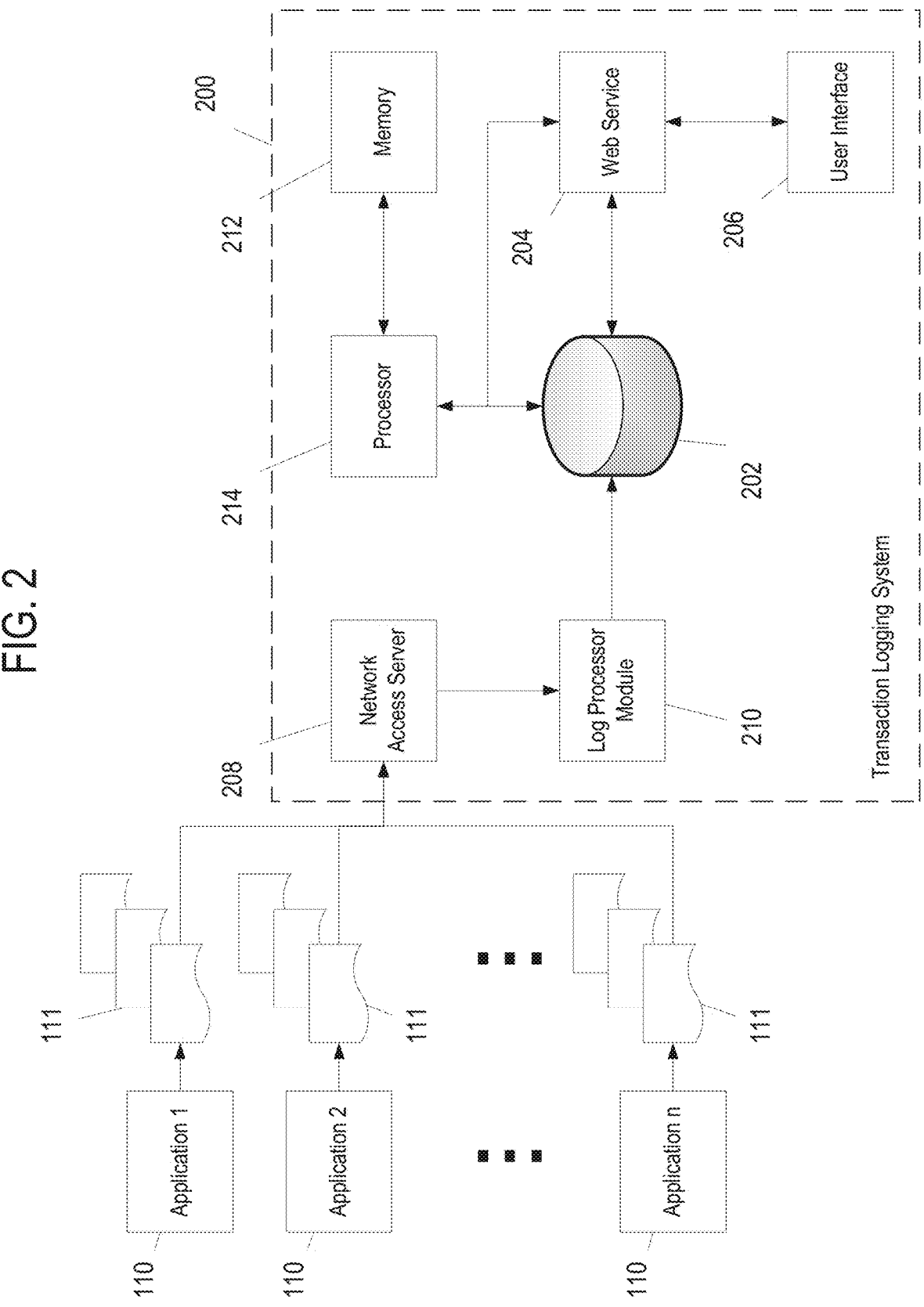
FIG. 2 is a block diagram of a transaction logging system, in accordance with at least one aspect of the present disclosure.

FIG. 2 is a block diagram of a transaction logging system 200, in accordance with at least one aspect of the present disclosure. The transaction logging system 200 is a computer system that comprises a computer or a set of multiple computers that are communicably connected together that is programmed to execute the described processes. The transaction logging system 200 can include, for example, a network access server 208, a log processor module 210, a database 202, and a web service 204 that is accessible via a user interface 206. Any or all of the aforementioned components of the transaction logging system 200 can be stored on, executed by, or otherwise associated with one or multiple computers that make up the transaction logging system 200. The transaction logging system 200 can be associated with a firm or organization that is utilizing the set of applications 110 to execute one or multiple types of transactions, where each application 110 in a workflow for a given transaction executes at least one portion or step of the transaction. In various aspects, the applications 110 can include software that is stored on and executed by a network or a cloud computing system operated or utilized by the firm, software delivered via accessing a central host (e.g., software as a service) via a client, or combinations thereof. For example, a financial services firm can utilize a set of applications 110 to place orders for buying and selling securities on behalf of clients, as is illustrated in FIGS. 1A and 1B.

The transaction logging system 200 is connected to a number (n) of applications 110. The n applications 110 can be part of a single application workflow for executing one transaction type (as depicted in FIGS. 1A and 1B) or multiple different application workflows for executing a variety of different transaction types. In one aspect, the transaction logging system 200 can include a network access server 208 to which the applications are communicably connectable. The network access server 208 acts as a single access point for all applications 110 that are connected or are seeking to be connected to the transaction logging system 200. In one aspect, the transaction logging system 200 can include a log processor module 210. The log processor module 210 can be programmed to extract application log files 111 from the network access server 208, transform the data from the application log files 111, and then upload the extracted data to a database 202 for storage thereon. The database 202 can include, for example, a referential database (e.g., an SQL server) or other database systems.

The transaction logging system 200 can further include a web service 204 that is hosted by or connected to a computer system storing the database 202, such that the web service 204 is able to query or otherwise retrieve data from the database 202. The web service 204 can include a RESTful service or other architectures for rendering the application data, for example. The web service 204 can further host or otherwise provide a user interface 206 for a client that can be utilized to construct database queries and can render the application data retrieved via the database queries, including the header data, the application log files 111, and other data collated by the transaction logging system 200. The user interface 206 (e.g., HTML or web pages) can be accessible or displayable by a variety of clients, such as a web browser or another software application programmed to communicate with the web service 204.

Figure 3:
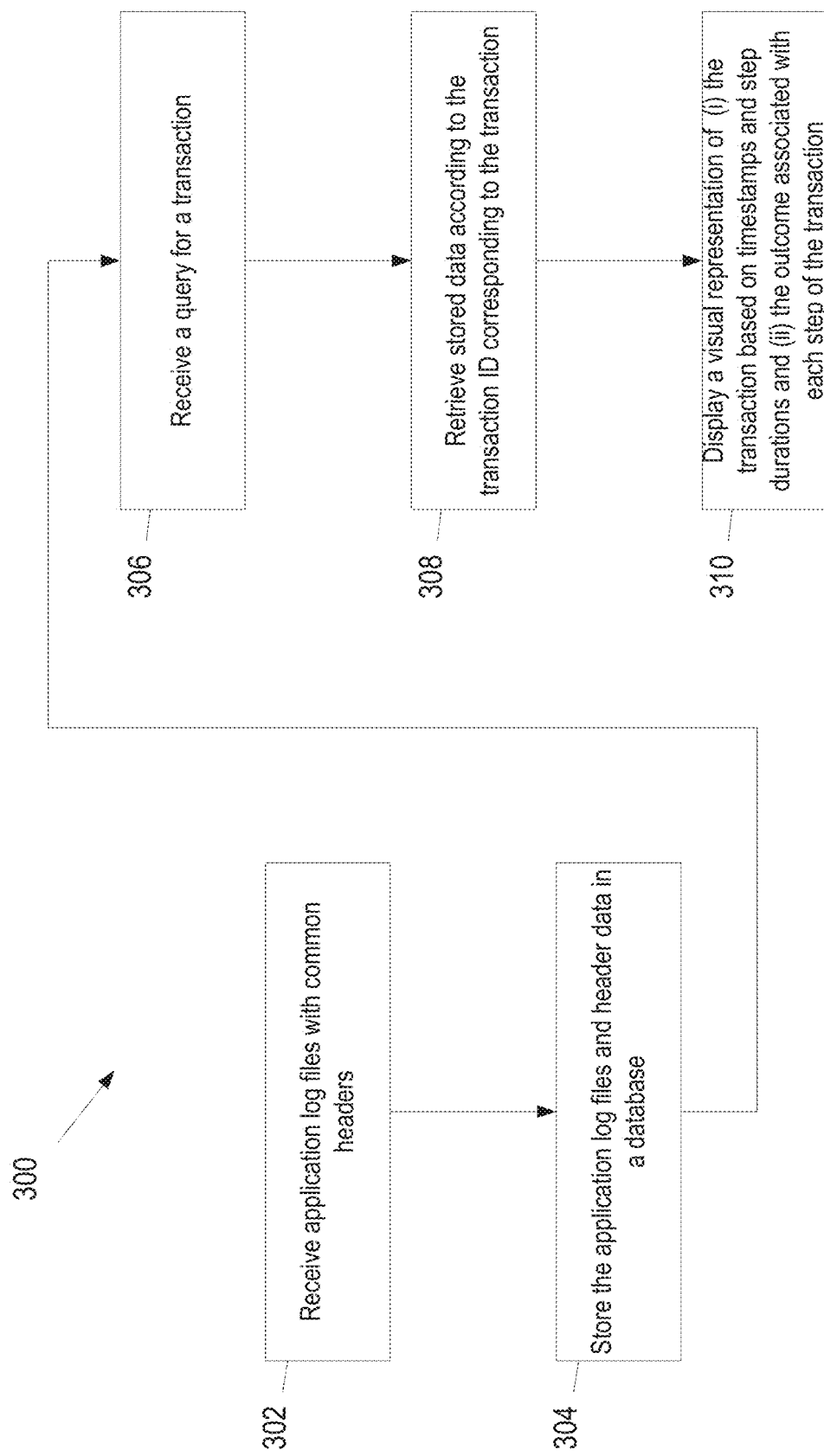
FIG. 3 is a logic flow diagram of a process for tracking a transaction across a series of applications 110 defining a workflow for executing a transactions, in accordance with at least one aspect of the present disclosure.

FIG. 3 is a logic flow diagram of a process 300 for tracking a transaction across a series of applications 110 defining a workflow for executing a transaction, in accordance with at least one aspect of the present disclosure. In the following description of the process 300, reference should also be made to FIG. 2. The process 300 can be executed by hardware, software, and/or firmware of a computer system, such as the processor 214 of the transaction logging system 200. Accordingly, the process 300 can be embodied as a set of computer-executable instructions stored in a memory 212 that, when executed by the processor 214, cause the computer system (e.g., the transaction logging system 200 or one or more computer systems associated with the transaction logging system 200) to perform the described steps. Further, each described step in the process 300 can be representative of one or multiple software modules programmed to cause the transaction logging system 200 to perform that particular step. Still further, although the process 300 is described as being executed by a processor 214, this is merely for brevity, and it should be understood that the depicted process 300 can also be executed across multiple computers that are communicably connected as a distributed computer system for performing the recited steps, such as in a cloud computing architecture.

At a first step 302, the transaction logging system 200 receives application log files 111 from the applications 110 as the applications 110 are utilized to execute transactions by the firm personnel. The applications 110 can be programmed to generate the application log files 111 as a matter of course during the execution of the application 110. Application log files 111 generally contain data pertaining to user or system events that occurred during the execution of the software application 110, errors, and other information generated by the application 110 as it executes its defined tasks. The data recorded in the application log files 111 serves as a detailed history of the events that occurred during the execution of the application 110, which can be used to help locate the source of an error or bug in the application 110 for a particular transaction. The format and content of the data recorded in the application log files 111 are generally determined by the developer of the application 110. This can make it challenging to collate application data across a large number of different applications 110, especially when the applications 110 have been designed by vendors for the firm, because there can be extensive differences in the format and content of the data in the application log files 111 for applications 110 programmed by different developers. However, in various embodiments, each of the applications 110 can be programmed to include or append a header having a common data structure or set of data fields, which is discussed in greater detail below, to each application log file 111 that is uploaded to the transaction logging system 200. By including a common header, the transaction logging system 200 is compatible with and able to ingest application data from any type of application 110, regardless of the technology (i.e., computer hardware, computer software, computer system architecture, programming language in which the applications are written, software framework according to which the applications operate, and so on) used to implement the application 110, and is agnostic as to the actual form and content of the non-header data recorded in the application log file 111. This flexibility of the transaction logging system 200 allows it to be utilized in connection with any type of computer system and/or software application system.

In one aspect, the applications 110 are connected to the transaction logging system 200 through a network access server 208. Through the connection to the network access server 208, the applications 110 upload the application log files 111 to the transaction logging system 200, which are then read by the log processor module 210. An illustrative header data structure, including the fields, brief descriptions of the fields, and example values for the fields, is provided below in Table 1. The header can include, for example, a unique ID associated with each given transaction ("transaction ID" or "correlationID"), the identity of the preceding application from which the present application received instructions for the transaction ("SourceApp"), the identity of the succeeding application in the workflow to which the present application transmits instructions for the transaction ("DestinationApp"), an outcome for the step in the transaction executed by the given application 110, a timestamp associated with the request for the given application 110 to execute its steps in the workflow, and the duration (e.g., in milliseconds) for the given application 110 to execute its step in the workflow. In one aspect, the initiating application for the application workflow (e.g., the order entry application 112 in the workflow illustrated in FIGS. 1A and 1B) can be programmed to generate a unique transaction ID for each transaction that the applications 110 (or a subset thereof) are seeking to execute. In these aspects, the generated transaction ID can then be passed from one application 110 to another in the workflow so that the application log files 111 generated during the course of the execution of the transaction can be associated with each other.

TABLE 1

| Field | Field Description | Sample Value |
| --- | --- | --- |
| product | Commodity type | Equity/Fixed Income/Syndicate |
| channel | Transaction initiator | Financial Advisor/Client |
| touchPoint | Transaction medium | Web/Mainframe |
| operation | Operation type | Validation/Submission/Modify |
| mode | Operation function | Buy/Sell/New/Exchange |
| correlationID | Unique order ID | gtm_Kz5EvNiCs2_201802 |
| activityName | Activity type | RetrieveAccountInfo/SubmitOrder |
| SourceApp | Activity source | Order Entry Application |
| DestinationApp | Activity destination | Data Service Endpoint Application |
| outcome | Activity result | Success/Failure |
| timestamp | Activity time | 2018-02-14T03:04:10.035 |
| duration | Activity duration | 642 milliseconds |

In various aspects, the header data structure can also include a variety of additional fields, such as the product, channel, touchpoint, operation mode, and/or activity name. The product field can identify the type of product on which the transaction is based. For example, a transaction to buy or sell securities can indicate that an equity product (e.g., stock) is being bought or sold. The channel field can identify the individual(s) or system that initiated the transaction. The touchpoint field can identify how the user has interacted with the firm. For example, if a client has initiated a transaction through the firm's website, then the touchpoint would be the web. The operation field can identify the type of operation being performed by the given application 110, such as validating data, submitting data for approval or to another application 110, modifying data, and so on. The mode field can further specify the type of operation identified in the operation field. The operation and mode fields can identify the specific task(s) being executed by the given application 110 as part of the application workflow 100. The activity name field can identify the general task being performed by the application workflow 100. For example, if the initiated transaction is an order to purchase a security on behalf of a client, the activity name can identify the activity as the submission of an order. In some aspects, the header generated by an application 110 for an application log file 111 may not populate every single field within the header data structure because certain fields may not be relevant to the given application 110. In these cases, the application 110 can, for example, leave the field blank or fill the field in the header with a default value. It should also be noted that the sample values for the fields in the header data structure are simply illustrative. Further, the values for the fields can be stored textually and/or numerically. Still further, the values for the fields can be descriptive (e.g., the value for the channel field can be "financial advisor" if a financial advisor initiates the transaction) or representative (e.g., the value for the channel field can be "1" if a financial advisor initiates the transaction, "2" if a client initiates the transaction, and so on).

At a second step 304, the transaction logging system 200 stores the application data contained in the header of each received application log file 111 in a database 202. In one aspect, the transaction logging system 200 can be programmed to also store the application log file 111 in the database 202, indexed according to the transaction ID and the other header data such that the application log files 111 can be directly retrieved and viewed by users in association with the transaction. The log processor module 210 can be programmed to extract the header from an application log file 111 transmitted to the transaction logging system 200 and then upload the application data from the header to the database 202 such that the application data is queryable at least according to the transaction ID associated with the transaction. In one aspect, the database 202 can store the header data from each application log file 111 as a database entry including a number of fields equal to the fields in the header data structure. Accordingly, the database 202 can store the complete set of application data from all of the application log files 111 generated during the course of the execution of each transaction across the entire set of applications 110 utilized to execute the transaction.

At a third step 306, the transaction logging system 200 receives a query related to a particular transaction via, for example, the search interface 500 illustrated in FIG. 5. This query can be an initial query to directly search for the given transaction ID or a follow-up query from an initial query. For example, if a user knows the transaction ID for the transaction that he or she wishes to view, then he or she can submit a query for the transaction ID via the user interface 206 to directly search for the data corresponding to that transaction, which then causes the transaction logging system 200 to retrieve the stored data associated with the transaction ID corresponding to the selected transaction, as described below. As an alternative example, a user can submit an initial query via the user interface 206 to see all transactions of a given type (e.g., a particular activity name) within a particular time range. In response to this query, the user interface 206 can retrieve the transaction records from the database 202 and display a list of all of the transactions that correspond to these criteria. After receiving the results of this initial query, the user can then select an individual transaction from the list, which then causes the transaction logging system 200 to retrieve the stored data associated with the transaction ID corresponding to the selected transaction, as described below.

At a fourth step 308, the transaction logging system 200 can retrieve the application data for the transaction ID corresponding to the queried transaction from the database 202, where the application data includes the header data from each of the application log files 111 uploaded to the database 202. For example, the web service 204 can retrieve the database entry from the database 202 that corresponds to the transaction ID. In one aspect, the transaction logging system 200 can further organize the application data based on the field values in the various entries in the database 202 into a coherent representation of the transaction. For example, in aspects where the header data structure includes fields such as the preceding application 110 in the application workflow, the succeeding application 110 in the application workflow, the timestamp associated with the application step, and the duration of the application step, the transaction logging system 200 can organize each step of the transaction executed by each application 110 according its relationship to other applications 110 within the application workflow and the timestamps of each step (to differentiate between transaction steps that may have identical preceding and succeeding applications 110 but were executed at different times). Accordingly, the transaction logging system 200 can reconstruct the entire transaction, end to end, based on the header data appended to the application log files 111 uploaded to the transaction logging system 200 by the applications 110.

At a fifth step 310, the transaction logging system 200 displays via, for example, the user interface 206, a visual representation of the retrieved application data for the queried transaction, including a visual representation of the transaction workflow and the outcome associated with each step of the transaction. In one aspect, the user interface 206 can be programmed to display a timeline diagram with each transaction step corresponding to each uploaded application log file 111 organized sequentially. An example implementation of a user interface 206 (or a portion thereof) for displaying a timeline diagram 400 is depicted in FIG. 4. The timeline diagram 400 displayed via the user interface 206 can include application identifiers 410 identifying the application 110 that executed each transaction step. The application identifiers 410 can be arranged sequentially according to the chronological order in which the transaction steps were executed during the transaction. Further, the timeline diagram 400 can include timestamps 402 associated with each transaction step. In one aspect, the timeline diagram 400 can include relations 404 indicating the workflow or relationships between the applications 110 executing the transaction. In addition to identifying the connections between applications 110, the relations 404 can also communicate other data to the user. For example, the length of the relations 404 can indicate the length of time the transaction step took to be executed by an application 110 or the relations 404 can include textual information 406, such as the operation being performed by the application 110. This information can obtained directly from the header data associated with the application log file 111 uploaded for the given transaction step or derived from the header data (e.g., the transaction step time can be determined by calculating the difference between a timestamp for a transaction step and a timestamp for the succeeding transaction step).

In the example of FIG. 4, at time stamp 12:42:47.872, application MOE sent a validation request to application GTM. At time stamp 12:42:47.891 (i.e., 0.019 seconds later), application GTM sent validations to applications UVE1 and GRE, and so on. The bottom of FIG. 4 shows that at time stamp 12:43:26.061 (i.e., approx. 38 seconds after the initial validation request), the application MOE made a submission to application OMA, which responded to application MOE 1 millisecond later. The application OMA also send the trade request to the exchange at time stamp 12:43:26.454, and received a response from the exchange that the trade was filled at 12:43:35.905 (i.e., about 9 seconds after the request was sent to the exchange).

In one aspect, the user interface 206 can further be programmed to display an error indicia 408 or indicia for other outcomes associated with a given transaction step. The error indicia 408 can be obtained from the header data associated with the application log file 111 uploaded for the given transaction step. The timeline diagram 400 allows users to quickly review a visual representation of the transaction reconstructed in an end-to-end manner, without the need to parse through individual application log files 111 for each of the applications 110 in the transaction workflow. In the example of FIG. 4, the error occurred at time stamp 12:42:48.044 in the communication between the EBC application and the GRE application. Further, by displaying an error indicia 408, the timeline diagram 400 highlights where an error or other issue occurred during the transaction workflow so that users can focus their efforts precisely where the error occurred, eliminating all of the time and effort associated with obtaining all of the various application log files 111 for the transaction, reviewing and interpreting disparate data formats for the various application log files 111, and then auditing the application log files 111 to determine where an error occurred. By collating all of the data from the various applications 100 involved in executing a transaction and displaying the collated data in an intuitive manner, the transaction logging system 200 and the associated process 300 reduce the time to audit transaction details from hours to minutes.

Further, the transaction logging system 200 can provide an array of additional features accessible to users via the user interface 206. In one aspect, when a user selects a given transaction step on the timeline diagram 400, the web service 204 can be programmed to retrieve the particular application log file 111 associated with that step and then display it to the user. That is, for example, some or all of the relations 404 can have hyperlinks, and when the user clicks on the hyperlink for a particular relation 404, details from the log file 111 for that particular step of the transaction can be displayed for the user.

In another aspect, the user interface 206 can include a search interface 500 as shown in FIG. 5 for querying the application transaction data stored in the database 202. The search interface 500 can include search fields 502 to allow users to submit search queries based upon a variety of different criteria, including the transaction step data represented in the header of each application log file 111, such as channel, operation, transaction ID, and so on. For example, the illustrative search interface 500 depicted in FIG. 5 shows the search results 504, including the transactions that occurred within the particular searched time range. As can be seen, the search interface 500 can further indicate the outcome associated with the transactions or particulars steps thereof.

In another aspect, the transaction logging system 200 can be customized or reprogrammed to include a variety of other transaction fields to the header data structure. These additional fields can be included in the header data structure that the applications 110 are programmed to append to the application log files 111, as described above. Accordingly, the database 202 can be configured to store the additional transaction fields in each entry for each transaction step, and the search interface 500 can be further programmed to include additional search fields 502 for executing queries on the database 202 for these fields. In another aspect, the transaction logging system 200 can be customized or reprogrammed to remove a variety of transaction fields represented by the header data structure. In some such aspects, one or more of the search fields 502 can be removed from the search interface 500. In one aspect, the search fields 502 available to users in the search interface 500 are based on a permission or security level associated with the user account with which the user is logged into the transaction logging system 200. For example, users with a higher permission level may have additional or different search fields 502 or other searching options available to them through the search interface 500. Therefore, systems administrators controlling the transaction logging system 200 can customize what data is available to users of the transaction logging system 200.

Accordingly, the transaction logging system 200 provides several benefits that solve issues inherent to organizations that use systems of interconnected applications for performing or executing various transactions. For example, the transaction logging system 200 collects and consolidates all of the application logs generated by the applications in a single location that is accessible by the organization's personnel. Further, by enforcing or receiving all of the data from the various applications to which the transaction logging system 200 is connected with a common header, the transaction logging system 200 can ingest the application logs and other data from any type of application and integrate all of the different application logs into a single, cohesive, searchable system. Still further, by combining the data from all of the application logs across an interconnected set of applications defining a particular workflow, the transaction logging system 200 provides a single, comprehensive, end-to-end view of every single transaction that has been executed. The end-to-end view of each transaction reveals to users the precise location at which an error or other issue occurred that caused a transaction to fail to be executed. Even still further, the transaction logging system 200 is designed to leverage a function that is already performed by the applications 110, namely, generating application log files 111, which essentially every single application 110 is already programmed to do. Therefore, the transaction logging system 200 operates asynchronously with the applications 110, eliminating any potential performance bottlenecks that could be caused by forcing the applications 110 in a transaction workflow to perform additional tasks from the original task that the application 110 was designed to perform.

Various aspects of the subject matter described herein are set out in the following aspects, implementations, and/or examples, which can be interchangeably combined together in various arrangements:

In one general aspect, therefore, the present invention is directed to a computer-implemented method for tracking a transaction that involves execution by a plurality of applications in a workflow for the transaction. The method comprises: (i) receiving, by a computer system, an application log file generated by each of the plurality of applications involved in the transaction, the application log file comprising a standard header that is appended to each application log file regardless of how the application log file is generated, the header comprising a transaction ID associated with the transaction, an outcome associated with a step of the transaction executed by each of the applications, and a timestamp associated with the step of the transaction; (ii) storing, by the computer system, each application log file and the header according to the transaction ID; (iii) retrieving, by the computer system, in response to a query for the transaction ID, data including each header from each application log filed generated during execution of the transaction corresponding to the transaction ID; and (iv) transmitting, by the computer system, the data to a user interface for display of a transaction history for the transaction.

In another general aspect, the present invention is directed to a computer-implemented method for tracking a transaction that involves execution by a plurality of applications in a workflow for the transaction. The method comprises: (i) receiving, by a computer system, an application log file generated by each of the plurality of applications involved in the transaction, the application log file comprising a standard header that is agnostic to technologies used to implement the applications in the workflow, the header comprising a transaction ID associated with the transaction, an outcome associated with a step of the transaction executed by each of the applications, and a timestamp associated with the step of the transaction; (ii) storing, by the computer system, each application log file and the header according to the transaction ID; (iii) retrieving, by the computer system, in response to a query for the transaction ID, data including each header from each application log filed generated during execution of the transaction corresponding to the transaction ID; and (iv) transmitting, by the computer system, the data to a user interface for display of a transaction history for the transaction.

In one aspect, the technologies used to implement the applications in the workflow can include computer hardware, computer software, computer system architecture, programming language in which the plurality of applications are written, or software framework according to which the plurality of applications operate.

In one aspect, the query is received by a web service, which retrieves the data corresponding to the transaction ID.

In one aspect, the outcome comprises a failure in execution of the step of the transaction.

In one aspect, the computer system includes a network access server to which the applications can connect to deliver the application log files to the computer system.

In one aspect, the header for each application log file is stored as a database entry according to the transaction ID; and retrieving, in response to the query for the transaction ID, the data including each header comprises retrieving, by the computer system, the database entry corresponding to the transaction ID.

In one aspect, each application log file is generated by each application during execution of each respective step of the transaction.

In another general aspect, the present invention is directed to a computer-implemented method for displaying a transaction history for a transaction involving execution by a plurality of applications in a workflow for the transaction. The method comprises: (i) retrieving, by a computer system, data associated with a transaction ID corresponding to the transaction from a database, the data derived from a header from each application log file generated by each application during execution of the transaction, the data comprising an outcome associated with a step of the transaction executed by each of the applications, and a timestamp associated with the step of the transaction; (ii) displaying, by the computer system, each step of the transaction and a corresponding application utilized to execute that step according to the timestamp; and (iii) displaying, by the computer system, the outcome associated with each step of the transaction.

In one aspect, the data for each step of the transaction further comprises a preceding application that executed a preceding step of the transaction and a succeeding application that executed a succeeding step of the transaction; and displaying each step of the transaction further comprises displaying, by the computer system, each step of the transaction and the corresponding application utilized to execute that step according to the timestamp, the preceding application, and the succeeding application.

In one aspect, displaying each step of the transaction further comprises displaying, by the computer system, each step of the transaction and the corresponding application utilized to execute that step as a timeline diagram on a user interface.

In one aspect, displaying, by the computer system, the outcome associated with each step of the transaction further comprises displaying, by the computer system, the outcome associated with each step of the transaction as an indicia on the timeline diagram.

In one aspect, the user interface displayed on a client and provided by a web service.

In one aspect, the data for each step of the transaction further comprises a duration of the step of the transaction; and the method further comprises displaying, by the computer system, a duration of each step of the transaction.

In one aspect, the method further comprises: retrieving, by the computer system, the application log file associated with the step of the transaction; and displaying, by the computer system, the retrieved application log file.

In other general aspects, the present invention is directed to a computer system that comprises a database, a processor coupled to the database, and a memory coupled to the processor that stores instructions that, when executed by the processor, cause the computer system to perform the method steps in the aspects described above.

The transaction logging system 200 may be implemented with one or a number of network computers, such as servers, mainframes, PCs, etc. Each computer of the transaction logging system 200 may comprise one or more processors (e.g., CPUs or GPUs), primary data storage or memory (i.e., memory that is directly accessible to the CPUs/GPUs, such as RAM, ROM, registers, cache memory), secondary data storage (i.e., data storage that is not directly accessible by the CPUs/GPUs, such as HDDs, flash, SSDs, etc.), nearline and/or off-line storage. The transaction logging system 200 may be programmed to perform the functions described herein with software that is stored in the primary, secondary, nearline and/or off-line data storage and executed by the processor(s) of the transaction logging system 200. The computer software may be implemented using any suitable computer programming language such as .NET, C, C++, JavaScript, Python, Ruby, Lua, and Perl, and using conventional, functional, or object-oriented techniques. Programming languages for computer software and other computer-implemented instructions may be translated into machine language by a compiler or an assembler before execution and/or may be translated directly at run time by an interpreter.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for tracking a transaction that involves execution by a plurality of applications in a workflow for the transaction, the method comprising:
    receiving, by a computer system, a plurality of application log files, wherein each of the plurality of log files is generated by one of the plurality of applications involved in the transaction, each application log file comprising a header that is appended to the application log file, wherein each header comprises a standard format, wherein the standard format comprises a plurality of data fields, wherein the plurality of data fields in the standard format of the header comprises, for each application log file:
        a transaction ID field for a transaction ID associated with the transaction,
        an outcome field for an outcome associated with a step of the transaction executed by the application generating the application log file,
        a source field that indicates a source in the workflow for the transaction to the application generating the application log file,
        a destination field that indicates a destination in the workflow for the transaction from the application generating the application log file, and
        a timestamp field for a timestamp associated with the step of the transaction for the application generating the application log file;
    storing, by the computer system, each application log file and the header according to the transaction ID; and
    displaying, by the computer system on a user interface, in response to a query for the transaction ID, data in the application log files with the transaction ID.

2. The computer-implemented method of claim 1, further comprising:
    receiving the query by a web service; and
    retrieving, by the web service, the data corresponding to the transaction ID.

3. The computer-implemented method of claim 1, wherein the outcome comprises a failure in execution of the step of the transaction.

4. The computer-implemented method of claim 1, wherein the computer system includes a network access server to which the applications can connect to deliver each application log file to the computer system.

5. The computer-implemented method of claim 1, wherein:
    the header for each application log file is stored as a database entry according to the transaction ID.

6. The computer-implemented method of claim 1, wherein each application log file is generated by each application during execution of each respective step of the transaction.

7. A computer system for tracking a transaction that involves execution by a plurality of applications in a workflow for the transaction, the computer system comprising:
    a database;
    a processor coupled to the database;
    a memory coupled to the processor, the memory storing instructions that, when executed by the processor, cause the computer system to:
        receive an application log file generated by each of the plurality of applications involved in the transaction, the application log file comprising a header that is appended to each application log file regardless of how the application log file is generated, wherein the header for applications log files for each of the applications comprises a standard format, wherein the standard format comprises a plurality of data fields, wherein the plurality of data fields in the standard format of the header comprises, for each application log file:
            a transaction ID field for a transaction ID associated with the transaction,
            an outcome field for an outcome associated with a step of the transaction executed by the application generating the application log file each of the applications,
            a source field that indicates a source in the workflow for the transaction to the application generating the application log file,
            a destination field that indicates a destination in the workflow for the transaction from the application generating the application log file, and
            a timestamp field for a timestamp associated with the step of the transaction for the application generating the application log file;
        store each application log file and the header according to the transaction ID in the database; and
        display, in response to a query for the transaction ID, on a user interface, data in the application log files with the transaction ID.

8. The computer system of claim 7, wherein the computer system is programmed to host a web service, the web service programmed to:
    provide the user interface to a client for receiving the query for the transaction ID; and
    retrieve the data corresponding to the transaction ID from the database.

9. The computer system of claim 7, wherein the outcome comprises a failure in execution of the step of the transaction.

10. The computer system of claim 7, wherein the computer system comprises a network access server to which the applications can connect to deliver each application log file to the computer system.

11. The computer system of claim 7, wherein:
    the header for each application log file is stored as a database entry according to the transaction ID in the database; and
    the computer system is programmed to retrieve the database entry corresponding to the transaction ID.

12. The computer system of claim 7, wherein each application log file is generated by each application during execution of each respective step of the transaction.

13. A computer-implemented method for displaying a transaction history for a transaction involving execution by a plurality of applications in a workflow for the transaction, the method comprising:
- receiving, by a computer system, an application log file generated by each of the plurality of applications involved in the transaction, the application log file comprising a standard header that is appended to each application log file regardless of how the application log file is generated, wherein the header for the application log files for each of the applications comprises a standard format, wherein the standard format comprises a plurality of data fields, wherein the plurality of data files in the standard format of the header comprises, for each application log file:
  - a transaction ID field for a transaction ID associated with the transaction;
  - an outcome field for an outcome associated with a step of the transaction executed by the application generating the application log file each of the applications;
  - a source field that indicates a source in the workflow for the transaction to the application generating the application log file;
  - a destination field that indicates a destination in the workflow for the transaction from the application generating the application log file;
  - an activity name field that indicates a task associated with the step of the transaction executed by the application generating the application log file; and
  - a timestamp field for a timestamp associated with the step of the transaction for the application generating the application log file;
- storing, by the computer system in a database, each application log file and the header according to the transaction ID;
- retrieving, by a computer system, data associated with a transaction ID corresponding to the transaction from the database;
- displaying, by the computer system, each step of the transaction and a corresponding application utilized to execute that step according to the timestamp; and
- displaying, by the computer system, the outcome associated with each step of the transaction.

14. The computer-implemented method of claim 13, wherein: displaying each step of the transaction further comprises displaying, by the computer system, each step of the transaction and the corresponding application utilized to execute that step according to the timestamp, the source application, and the destination application.

15. The computer-implemented method of claim 13, wherein displaying each step of the transaction further comprises displaying, by the computer system, each step of the transaction and the corresponding application utilized to execute that step as a timeline diagram on a user interface.

16. The computer-implemented method of claim 15, wherein displaying, by the computer system, the outcome associated with each step of the transaction further comprises displaying, by the computer system, the outcome associated with each step of the transaction as an indicia on the timeline diagram.

17. The computer-implemented method of claim 15, wherein the user interface displayed on a client and provided by a web service.

18. The computer-implemented method of claim 13, wherein:
- the data for each step of the transaction further comprises a duration of the step of the transaction; and
- the method further comprises displaying, by the computer system, a duration of each step of the transaction.

19. The computer-implemented method of claim 13, further comprising:
- retrieving, by the computer system, the application log file associated with the step of the transaction; and
- displaying, by the computer system, the retrieved application log file.

20. The computer-implemented method of claim 1, wherein the plurality of data fields in the standard format of the header further comprises, for each application log file, a duration field that indicates a duration for the task in the workflow for the transaction performed by the application generating the application log file.

21. The computer-implemented method of claim 1, wherein the plurality of data fields in the standard format of the header further comprises, for each application log file, an activity name field that indicates a task associated with the step of the transaction executed by the application generating the application log file.

* * * * *